United States Patent Office
3,372,392
Patented Mar. 5, 1968

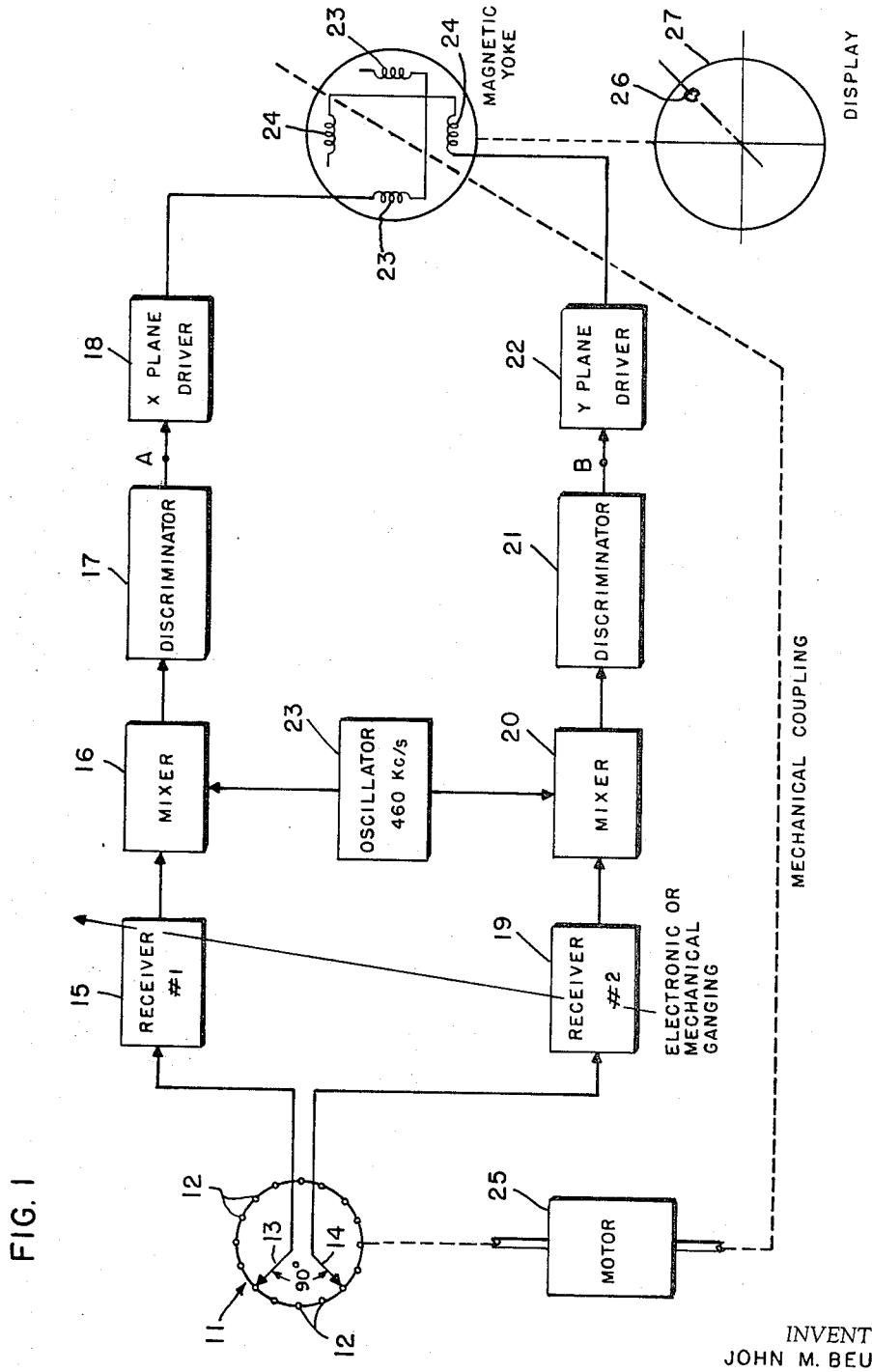

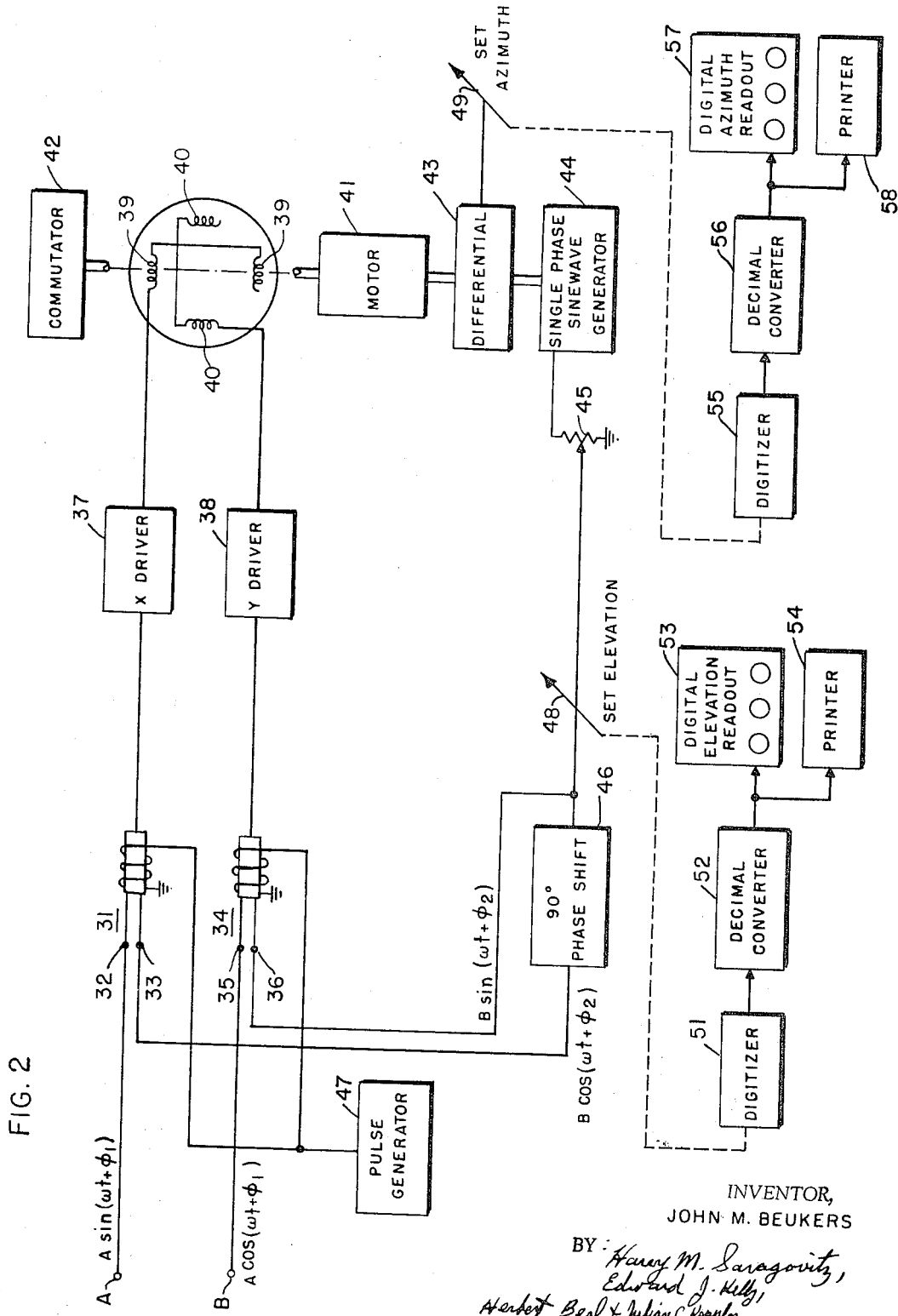

3,372,392
ELECTRONIC ALIDADE FOR A DIRECTION
FINDER SYNCHRONOUS INDICATOR
John M. Beukers, Stony Brook, N.Y., assignor, by mesne assignments, to the United States of America as represented by the Secretary of the Army
Filed June 28, 1966, Ser. No. 562,434
7 Claims. (Cl. 343—113)

ABSTRACT OF THE DISCLOSURE

An electronic alidade for providing digital readout of both azimuth and elevation information from Doppler direction finders is provided. In its basic form the Doppler radio direction finder comprises of a number of equally spaced antenna elements which are located on the circumference of a circle. Each antenna element is sequentially connected to a receiver by means of a commutator. The receiver processes the information and it is displayed on a cathode ray screen as a dot. The distance of the dot from the center of the cathode ray tube display is a measure of the amplitude of the signal and its angular position from a reference axis is a measure of the phase angle. From this information azimuth and elevation can be determined by the operator by use of a line alidade and peripheral azimuth degree scale. In the disclosed system an electronic alidade and digital readout is provided. The electronic alidade consists of means controllable by the operator for generating a spot anywhere on the face of the cathode ray tube. The elevation and azimuth signals from the receiver are applied to the electronic alidade system. The operator manipulates two dials on the electronic alidade so as to superimpose the spot generated by the electronic alidade system on the spot generated by the Doppler direction finder. The angular positions of the dials are converted to digital information that is either displayed or printed out at the command of the operator.

This invention relates to Doppler direction finder displays and more particularly to an electronic alidade for providing digital readout of both azimuth and elevation information from Doppler direction finders.

In its basic form the Doppler radio direction finder consists of a number of equally spaced antenna elements which are located on the circumference of a circle. Each antenna element is sequentially connected to a receiver (or receivers) by means of a commutator. Antenna element spacing together with the commutator process imposes a phase modulation upon an arriving carrier thereby imparting to this carrier information concerning its direction of arrival. Directional information is extracted by phase demodulation and then phase and amplitude comparison of the detected data signal to internally generated reference signals. The envelope phase of this phase modulation, relative to the particular antenna of the circular array which is instantaneously connected to the receiver, is dependent upon the azimuthal location of the transmitter. This angular position os designated by the angle $\phi$ measured from due North of the center of the circular array of antennas. The imposed phase modulation deviation or modulation index is dependent upon the radius of the circular antenna array, the carrier frequency of the transmission being received, and the angle which the line of propagation of the received carrier makes with the horizontal. This angle is called the vertical angle of arrival. In a system of the type described the relative phase ($\phi$) of the data signal (that signal which appears at the output of the receiver phase demodulator) is a measure of the azimuthal direction of arrival of a transmission, and the amplitude of the data signal is a measure of the vertical angle of arrival of a transmission.

In its basic form a Doppler direction finder may contain separate indicators for displaying elevation and azimuth. The elevation data signal (that which is applied to the input terminal of the elevation indicator) is obtained by passing the data signal from the output of the receiver phase demodulator through an amplitude correction circuit. The azimuth data signal is obtained by comparing the phase of the data signal with the phase of a signal generated by a reference generator which is driven by the same motor that drives the antenna commutator switch.

A two channel synchronous display has been developed to assist the operator in his task of determining azimuth and vertical angle information. Under ideal conditions the synchronous display consists of a single spot generated on the cathode ray tube. The distance of this spot from the center of the display is equal to the amplitude of the data signal, and its angular position from a reference axis is a measure of the phase angle $\phi$. Parameters other than azimuth and vertical angle may be determined by the display when it deviates from a single spot into a small circle, a distorted circle, etc. However, for the purpose of this discussion, the display may be considered to be a single spot.

It is current practice for an operator to determine azimuth and vertical angle by using an engraved diametrical line alidade and peripheral azimuth degree scale. There are several disadvantages to this method of readout which are overcome by utilizing an electronic alidade and digital readout. The electronic alidade is particularly applicable to synchronous displays since both azimuth and elevation can be simultaneously determined and read out on separate digital indicator banks—preferably in two colors.

It is therefore an object of this invention to provide an electronic readout device for displaying azimuth and elevation angle in direction finding receivers.

A more specific object of this invention is to provide an electronic alidade for direction finding receivers which can be quickly and simply manipulated by an operator to provide digital readout of azimuth and vertical angle information.

Some advantages of such a scheme are as follows:
(a) An electronic alidade has no parallax.
(b) Indicator errors are automatically compensated.
(c) Azimuth scale and vertical angle scale illumination are unnecessary.
(d) Adjustment of electronic alidade position can be made with controls located at table level (one control for azimuth and one for elevation). Simultaneous operation of both controls is possible.

A system which provides this type of readout will now be briefly described. The electronic alidade portion of the readout is designed specifically for use with the synchronous display. However, the digital readout and printer portion of the system are compatible with current instrumentation.

The electronic alidade of this invention consists of means controllable by the operator for generating a spot anywhere on the face of the cathode ray display tube. The operator manipulates two dials which vary the angular position of the spot and the radius of the spot from the center of the display. By these manipulations the spot generated by the operator is superimposed on that generated by the Doppler direction finder receiver which also appears on the same display tube. The angular positions of the two dials are converted to digital information which is either displayed or printed out at the command of the operator.

The nature of the present invention along with various advantages, objects and features thereof will become more apparent upon consideration of the accompanying drawings and the following detailed description of those drawings.

In the drawings:

FIG. 1 is a block diagram of a Doppler direction finder receiver having synchronous display instrumentation, and FIG. 2 is a block diagram of an electronic alidade having semi-automatic digital readout.

Although this invention resides in the electronic alidade of FIG. 2, the receiver shown in FIG. 1 is described as being one which may be used in conjunction with the electronic alidade. In this figure an antenna array and commutating means are generally indicated by the reference numeral 11. The antenna array consists of a number of equally spaced monopole antennas 12 located around the circumference of a circle. Each antenna is actually connected to a central commutating element by means of individual cables of equal length (not shown). The commutating element sequentially connects each of the antennas to two independent receiving channels and employs two pick-up devices 13 and 14 mounted on a rotor for this purpose. The pick-up devices are separated by a geometric angle of 90°. Thus each channel receives identical information with the exceptions that (a) there is a 90° phase difference between the imposed Doppler phase modulation in each channel, and (b) a difference of signal phase and amplitude will occur when there are phase disturbances across the array such as would be caused by multipath and improper antenna cable phasing.

The two receiving channels respectively consists of receivers 15 and 19 and mixers 16 and 20. These two receiving channels are identical; however gain and phase balance in the receiver are unnecessary. Each receiving channel feeds an identical aperiodic discriminator (17 and 21) the output of which is direct-coupled to an $x$-plane driving amplifier 18 and $y$-plane driving amplifier 22. The output stages of the drivers are low impedance and are suitable for driving the deflection coils 23 and 24 of a magnetic yoke to which they are direct coupled. The yoke is located around the neck of a cathode ray display tube and may be rotated about an axis through the center and perpendicular to the face of the tube. Connections to the rotating yoke are made through slip rings (not shown). The yoke and the antenna commutator are both rotated by a motor 25 as indicated by the broken line labeled "mechanical coupling."

The operation of the direction finder of FIG. 1 will now be considered. It has been stated above that one of the two channels feeds an $x$ yoke driving amplifier and the other feeds a $y$ yoke driving amplifier. Also, the deflecting yoke is capable of rotation.

The sinusoidal data signal derived from the $x$ channel may be represented as:

$$x = A \sin (wt. + \phi_1)$$

By design of the commutator rotor, the data signal derived from the $y$ channel is 90° out of phase with the $x$ channel. It may therefore be expressed as:

$$y = A \cos (wt. + \phi_1)$$

Since the yoke rotates at the same angular speed as the commutator, a single point is generated by the $x$ and $y$ data signals. The distance of the point from the center of the display is equal to the amplitude of the data signal and its angular position from a reference axis is a measure of the phase angle $\phi_1$. Therefore, if the $yy$ axis of the cathode ray tube is taken as reference axis, the angular position of point P from this axis will be the bearing of a signal measured in the conventional clockwise manner from due North or zero degrees. Since the amplitude of the signal is a measure of the elevation angle of a transmission, the distance of point P from the center of the display is representative of elevation angle.

The display may appear as an irregular circle 26 which is generated on the cathode ray tube face 27. The center of this circular display is the point P. It is current practice for an operator to determine azimuth and vertical angle by using an engraved diametrical line alidade and peripheral azimuth degree scale.

The disadvantages of this method are overcome by employing the electronic alidade and digital readout of FIG. 2. Terminals A and B of FIG. 2 are connected to the terminals A and B which are located at the outputs of discriminators 17 and 21 of FIG. 1. The data signal at terminal A is shown as being $A \sin (wt. + \phi_1)$, and that at terminal B as being $A \cos (wt. + \phi_1)$. Terminal A is connected to an input terminal 32 of a reed switch 31, and terminal B is connected to an input terminal 35 of a reed switch 34. The output terminals of reed switches 31 and 34 are respectively connected to $x$ driving amplifier 37 and $y$ driving amplifier 38, the outputs of which are connected to the yoke coils 39 and 40. A motor 41 rotates both a commutator 42 and the yoke coils. The motor 41 is also connected through a differential 43 to a single phase sinewave generator 44. The output from the generator 44 is connected to a potentiometer 45, the tap of which may be varied to change the amplitude of the generated signal. The reference signal is coupled directly to the reed switch input terminal 36 over a line marked $B \sin (wt. + \phi_2)$. The reference signal is also coupled to the reed switch input terminal 33 by a 90° phase shifter 46 and a line marked $B \cos (wt. + \phi_2)$.

The reed switches 31 and 34 are electronically controlled by a pulse generator 47. These switches alternately connect the data signals and the reference signals to the display. A duty cycle of 10:1 in favor of the data signals may be employed.

The amplitude of the reference signals is controlled by the potentiometer 45 whereas the phase is adjustable by means of the differential 43. The arrows 48 and 49 represent the adjustable feature of these two controls and in actual practice are dials to be adjusted by an operator. The reference signals are therefore two sinewaves of equal and manually variable amplitude and of fixed relative phase but of manually variable absolute phase. When applied to the display through the reed switches and driver amplifiers, these reference waveforms will form a spot the azimuth position of which is determined by the azimuth control 49, the distance from the center of the display being determined by the elevation control 48. This reference display is identical to the data display. The reference spot may be placed anywhere on the tube face by operation of the two controls and may therefore be superimposed on the data display.

Connected to the elevation control are a digitizer 51, decimal conversion unit 52 and digital display 53. Similarly, a digitizer 55, decimal conversion unit 56 and digital display 57 are connected to the azimuth control. Therefore, when superimposition of the reference spot on the data display occurs, azimuth and elevation information may be read directly from the digital displays or may be printed out by printers 54 and 58 which are also connected to the decimal conversion units 52 and 56 respectively.

If a line is favored rather than a spot, it may be obtained by high frequency modulation of the deflection voltages applied to the magnetic CRT centering coils.

I claim:

1. A Doppler direction finding receiver comprising receiver means for producing first and second sinewave data signals which are in phase quadrature with respect to each other, the phase of said first and second data signals being indicative of the direction from which a received transmission has originated, and the amplitude of said data signals being indicative of the vertical angle of arrival of said transmission; a cathode ray tube having first and second sets of rotatable yoke coils; means for generating first and second sinewave signals which are in phase quadrature with respect to each other and which are of the same frequency as said data signals; means for adjusting the phase of said generated signals; means for adjusting the amplitude of said generated signals; first switch means for alternately connecting said first data signal and said first generated signal to said first set of yoke coils; second switch means for alternately connecting said second data signal and said second generated signal to said second set of yoke coils; means for rotating said yoke coils at such a rate that said data signals and said generated signals each generate a single spot on the face of the cathode ray tube; and means for indicating the condition of adjustment of said amplitude adjusting means and said phase adjusting means.

2. A direction finding receiver as set forth in claim 1 wherein said receiver means comprises antenna means for imposing a phase modulation on said received transmission, said antenna means having two output terminals at which said phase modulated transmission appears in phase quadrature; and first and second discriminator means respectively connected to said output terminals, said data signals appearing at the outputs of said discriminator means.

3. A direction finding receiver as set forth in claim 2 wherein said antenna means comprises a circular array of equally spaced antennas and commutator means having first and second switching elements which sequentially connect said antennas to said first and second discriminator means, said first and second switching elements at any given time being connected to antennas which are geometrically separated by ninety degrees; said means for rotating said yoke coils also rotating said commutator means.

4. A direction finding receiver as set forth in claim 1 wherein said means to rotate said yoke coils also drives said generating means and said phase adjusting means comprises a differential coupling located between said means to rotate and said generating means.

5. A Doppler direction finding receiver comprising antenna means for imposing a phase modulation on a received transmission indicative of the direction from which said transmission has originated, said antenna means having two output terminals at which said phase modulated transmission appears in phase quadrature; first and second discriminator means respectively connected to said two output terminals; a cathode ray tube having first and second sets of rotatable yoke coils; a sinewave generator; a motor connected to said rotatable yoke coils for rotating the same; differential means connecting said motor to said generator for adjusting the phase of the generated sinewave; means for adjusting the amplitude of said generated sinewave; means for providing first and second output paths from said sinewave generator, the signals appearing on said paths being in phase quadrature; first switch means for alternately connecting said first discriminator and said first generator output path to said first set of yoke coils; second switch means for alternately connecting said second discriminator and said second generator output path to said second set of yoke coils; and means connected to said differential means and said amplitude adjusting means for indicating the condition of adjustment thereof.

6. A direction finding receiver as set forth in claim 5 wherein said antenna means comprises a circular array of equally spaced antennas and commutator means having first and second switching elements which sequentially connect said antennas to said first and second discriminator means, said first and second switching elements at any given time being connected to antennas which are geometrically separated by ninety degrees; said motor also rotating said commutator means.

7. A Doppler direction finding receiver as set forth in claim 5 wherein said condition indicating means comprises means connected to said amplitude adjusting means for converting the analog condition thereof to a digital display of the elevation angle of said transmission; and means connected to said differential means for converting the analog condition thereof to a digital display of the azimuth of said transmission.

References Cited
UNITED STATES PATENTS

| | | |
|---|---|---|
| 2,278,641 | 4/1942 | Bond. |
| 2,603,775 | 7/1952 | Chipp _____ 315—26 X |
| 3,329,955 | 7/1967 | Beukers et al. _____ 343—113 |
| 3,060,427 | 10/1962 | Jaffe et al. |

RODNEY D. BENNETT, *Primary Examiner.*

RICHARD E. BERGER, *Examiner.*